US009601867B2

(12) United States Patent
Fleer et al.

(10) Patent No.: US 9,601,867 B2
(45) Date of Patent: Mar. 21, 2017

(54) CORD RETENTION AND MOISTURE SEAL FOR ELECTRIC MOTORS

(71) Applicant: QM Power, Inc., Lee's Summit, MO (US)

(72) Inventors: Mark Fleer, Lee's Summit, MO (US); Gary Harper, Lee's Summit, MO (US)

(73) Assignee: QM Power, Inc., Kansas City, MO (US)

( * ) Notice: Subject to any disclaimer, the term of this patent is extended or adjusted under 35 U.S.C. 154(b) by 0 days.

(21) Appl. No.: 14/707,047

(22) Filed: May 8, 2015

(65) Prior Publication Data

US 2016/0329657 A1 Nov. 10, 2016

(51) Int. Cl.
*H02G 3/18* (2006.01)
*H01R 13/58* (2006.01)
*H01R 13/52* (2006.01)
*H01R 43/16* (2006.01)

(52) U.S. Cl.
CPC ..... *H01R 13/5845* (2013.01); *H01R 13/5205* (2013.01); *H01R 43/16* (2013.01)

(58) Field of Classification Search
CPC .................................................. H02G 15/1806
USPC ............... 174/151, 152 R, DIG. 8, 656, 667; 439/730, 932
See application file for complete search history.

(56) References Cited

U.S. PATENT DOCUMENTS 3,502,917 A * 3/1970 Bizoe ..................... H02K 5/225 174/153 G
4,137,558 A * 1/1979 Beaman ................... G12B 9/08 174/151
4,233,534 A * 11/1980 Tharman ................ H02K 5/225 310/68 D
4,289,923 A * 9/1981 Ebert ..................... H02G 3/065 174/153 G
4,306,760 A * 12/1981 Testa .................... G02B 6/3887 174/DIG. 8
4,341,921 A * 7/1982 Simpson ................ H01R 4/723 174/84 R
4,467,137 A * 8/1984 Jonathan ................ H02G 15/06 156/49
4,565,417 A * 1/1986 Dussel ................... H01R 11/32 439/108
5,098,319 A * 3/1992 McGaffigan ......... B23K 3/0475 174/DIG. 8
5,360,945 A * 11/1994 Truesdale, Jr. .... H01R 13/5205 174/151
5,635,674 A * 6/1997 Owen .................. H02G 3/0616 174/152 R
6,162,087 A * 12/2000 Hiura ................ H01R 13/5213 174/152 G
6,257,923 B1 * 7/2001 Stone .................. H01R 13/516 280/422

(Continued)

*Primary Examiner* — Neil Abrams
(74) *Attorney, Agent, or Firm* — James M. Stipek; Polsinelli PC

(57) ABSTRACT

A fluid-tight strain relief seal for a cable connecting an electric device is disclosed. In a housing for an electrical device an integrally molded nipple is provided that is configured to carry an electrical cable therethrough. The nipple comprises a proximal portion and a distal portion, the distal portion being closer to an exterior wall of the housing and the proximal portion shaped like a barb. A sleeve is fixed over the cable, the barb and the nipple to provide the seal.

8 Claims, 3 Drawing Sheets

Section A-A
(Figure not to scale)

(56) References Cited

U.S. PATENT DOCUMENTS

| | | | | |
|---|---|---|---|---|
| 6,359,223 | B1 * | 3/2002 | Daoud | G02B 6/4428<br>174/658 |
| 6,443,457 | B1 * | 9/2002 | Daoud | H02G 15/013<br>174/651 |
| 6,840,803 | B2 * | 1/2005 | Wlos | H01R 9/0518<br>439/578 |
| 6,860,756 | B2 * | 3/2005 | Chen | H01R 4/72<br>439/523 |

* cited by examiner

Section A-A
(Figure not to scale)

Section B-B
(Figure not to scale)

Section C-C
(Figure not to scale)

CORD RETENTION AND MOISTURE SEAL FOR ELECTRIC MOTORS

FIELD OF THE INVENTION

This invention relates generally to connectors for electrical appliances and specifically to means for providing cable attachment to an electrical appliance housing that is mechanically robust as well as providing a moisture seal while minimizing the number of connector and bulkhead components.

DESCRIPTION OF THE RELATED ART

Standards such as UL 817 and IEC 884 specify testing requirements for power connectors including moisture resistance test, abrupt pull test and strain relief test. The mechanical integrity of the connection between the cable and the components of the housing must be maintained such that the electrical contact is not compromised by mechanical wear, moisture ingress, and the like.

U.S. Pat. No. 4,289,923A discloses a strain relief grommet with a hinged joint, with projections that bear on the cable to provide a seal. The half members are folded together around the electrical cord and inserted in a notch in the frame of the motor with the hinge located on the upper side of the grommet. The inside of the grommet is provided with rows of intermittent teeth or sharp pointed projections. When the half members forming a grommet are forced into the notch with the cord running through it the grommet is forced to close and the teeth pierce the outer jacket of the cord and place a bite on the inner insulation material. The piercing of the insulation during initial assembly can cause further weakening and breakdown of the cable insulation.

U.S. Pat. No. 5,089,735A discloses a tapered grommet seal held in place by a cap. By pushing the end face of the grommet into a tapered cord insertion hole provided inside the front bracket of the motor housing, a seal is formed around the cable. The cap and front bracket are locked into position using a positive latching mechanism. The disadvantage of such a design is the need for precise dimensioning of the grommet, insertion hole, and the latch. The other disadvantage is the number of parts needed to make the seal and the latching mechanism operate. Each additional component represents an additional mode of failure of the seal and/or the latching mechanism.

The solutions discussed previously do not provide a cost-effective and reliable mechanical connection that is both moisture-resistant and provides strain relief to the electrical cable where it attaches to the electrical appliance. In addition, these solutions do not address a one-step assembly process. The present invention addresses these and other objectives.

SUMMARY OF THE INVENTION

A fluid-tight strain relief seal for a cable connecting an electric device is disclosed. In a housing for an electrical device integrally molded with a nipple that is configured to carry an electrical cable therethrough. The nipple comprises a proximal portion and a distal portion, the distal portion being closer to an exterior wall of the housing and the proximal portion shaped like a barb. A flexible sleeve is shrunk over the cable, the barb and the nipple to provide the seal and relative mechanical fixation between the cable and housing. The shape of the barb locks the sleeve in position once the sleeve has been shrunk over the barb. This locking force can withstand tugging forces on the loose end of the cable that are transmitted to the sleeve and then to the housing through the barb and nipple. This prevents the sleeve from sliding off the nipple and barb when the cable is tugged and the locking force can be designed to meet the minimum requirements of the mechanical tests for providing strain relief. The sleeve may be an adhesive-backed waterproof sleeve heat-shrunk over the cable, the barb and the nipple. The nipple and the barb may be provided with additional features for gripping the cable. The features may be longitudinal slots open at the distal end or projections on the inner surface of the nipple.

A method of providing a strain relief seal for a cable connecting an electric device is disclosed. The method comprises providing a molded housing for the electric device with an integrally molded nipple and barb and inserting the cable through the nipple. A flexible sleeve is then inserted over the cable, the barb and the nipple. The sleeve is then shrunk over the outer portion of the cable, barb and nipple to form a fluid-tight seal. In one embodiment, the sleeve may be a thermoplastic polymer that is heat-shrunk onto the nipple and the cable. In another embodiment the sleeve may be adhesive-backed waterproof heat shrink tubing.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1A:
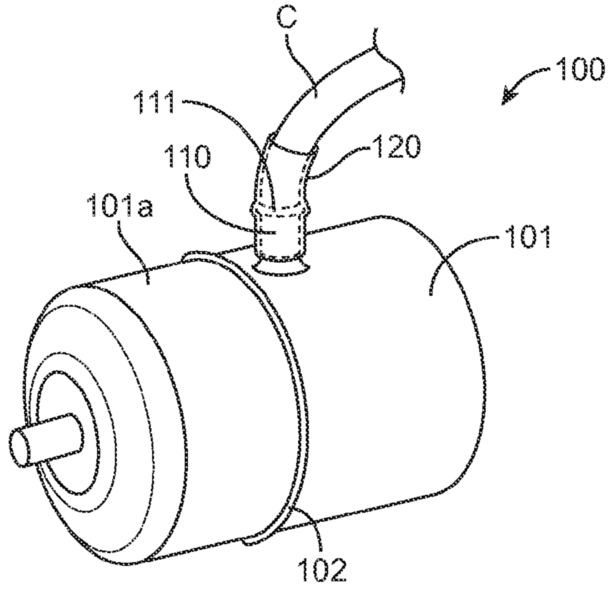
FIG. 1A illustrates the mechanical attachment of electrical cable according to one embodiment.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of “a”, “an”, and “the” include plural references. The meaning of “in” includes “in” and “on.” Referring to the drawings, like numbers indicate like parts throughout the views. Additionally, a reference to the singular includes a reference to the plural unless otherwise stated or inconsistent with the disclosure herein.

In one embodiment, a strain relief seal for entry of a cable into a housing 100 for an electrical device such as an electric motor is disclosed. As illustrated in FIG. 1A, a motor housing 100 in two housing portions 101 and 101*a*, are mated along a section 102. Entry for a cable C is provided in housing portion 101 via integrally molded nipple 110 extending out of the housing 101. The distal end of the nipple 110 is attached to the housing 101, while the proximal end is shaped like a barb 111. The barb 111 has its largest radial dimension offset from the proximal end of the nipple 110. The shape of the barb 111 is such that the sleeve can slide over it easily from the distal portion but it is harder to slide the sleeve in the opposite direction. The barb 111 may have hooked ends, straight or curved ends. The barb 111 may have a surface finish that is asymmetric, that is, it feels smooth in one direction and rough in the opposing direction.

The cable C is mechanically attached to the housing 101 using a sleeve 120 fitted over cable C, the barb 111 and the nipple 110. In one embodiment the elongated annular sleeve 120 is capable of radial shrinkage with the application of thermal or mechanical energy. The sleeve 120 is axially positioned while in its undeformed state so that the distal end of the sleeve lies between the distal end of the nipple 110 and the housing 101, and the proximal portion of the sleeve 120 covers the barb 111 and at least a portion of the cable C beyond the proximal end of the nipple 110. During assembly the radius of the sleeve 120 is reduced by plastic deformation by the application of energy such that it grips portions of the cable C and the nipple 110.

Figure 1B:
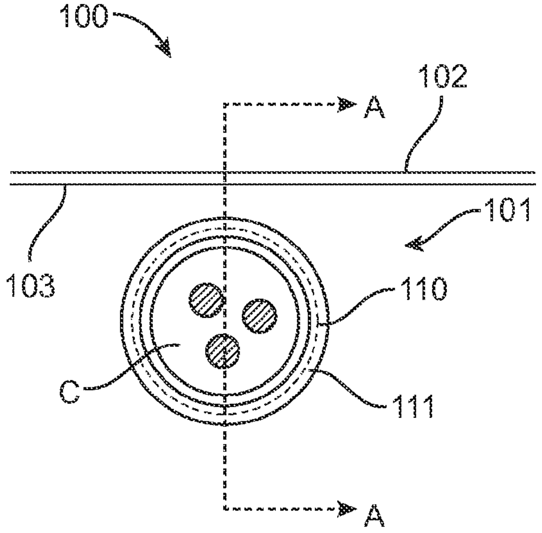
FIGS. 1B and 1C show sections of the mechanical attachment of electrical cable according to one embodiment.
Figure 1C:
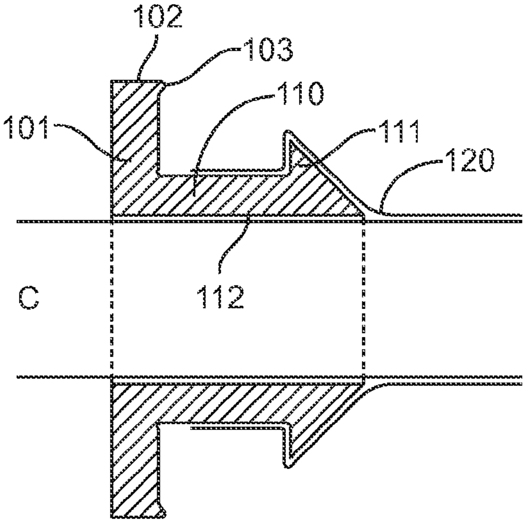

Sectional views of one embodiment of the mechanical attachment for a cable are shown in FIGS. 1B and 1C. FIG. 1B shows a top view looking down on the nipple and FIG. 1C shows a view of vertical section A-A of the nipple. As shown in FIG. 1C, the nipple 110 is provided with barb 111 and accommodates cable C through its internal bore 112. In one embodiment the fluid-tight seal is provided by a sleeve 120 extending along the nipple 110, configured to be affixed over nipple 110 and the cable C for a sufficient length to provide sealing as well as strain relief. In one embodiment the sleeve 120 may be of a thermoplastic polymer affixed in place by heat shrinking. In one embodiment the sleeve 120 is provided with adhesive backing to effectively grip the cable C and the nipple 110. The sleeve 120 can also be fixed using mechanical means such as a collar, tie, wire coil and the like. In another embodiment, the sleeve 120 could be fixed using one or more of the means described above. In one embodiment, the housing 100 is made of suitable moldable polymer such as nylon, polyvinyl chloride, etc.

Figure 2A:
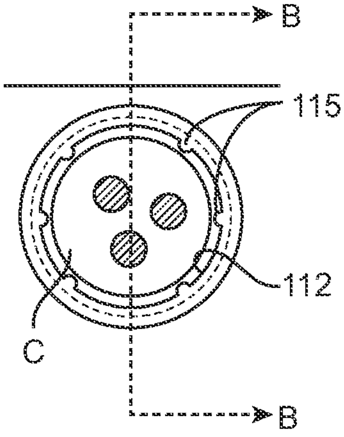
FIGS. 2A and 2B show one embodiment of the nipple with inward protrusions.
Figure 2B:
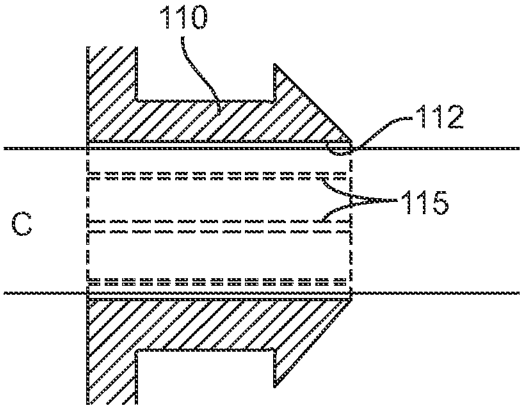
Figure 2C:
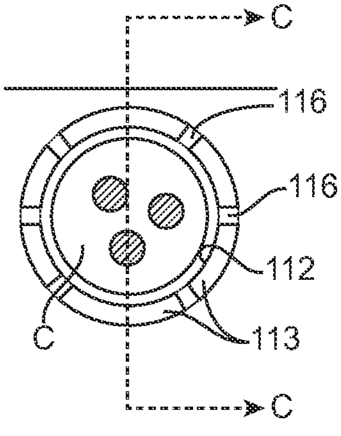
FIGS. 2C and 2D show an embodiment of the nipple with longitudinal slot across the nipple and barb.
Figure 2D:
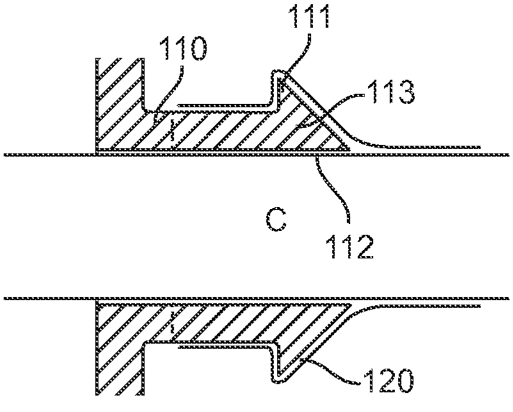

In other embodiments shown in FIGS. 2A-2D, features are provided on the nipple 110 that may be provided either longitudinally or along the circumference of the inner bore 112 of the nipple 110 for gripping the cable C. In one embodiment shown in FIGS. 2A and 2B, the inner bore 112 of the nipple 110 may carry projections 115 for gripping and resisting rotation of the cable C. FIG. 2A shows a top view of the nipple 110 while FIG. 2B shows longitudinal section B-B of the nipple 110. In one embodiment the projections 115 are continuous longitudinal projections, while in another embodiment the projections 115 may be discontinuous. In another embodiment shown in FIGS. 2C and 2D, the distal portion of the nipple 110 and barb 111 may carry longitudinal slots 116, providing flexible legs 113. FIG. 2C shows a top view of the nipple 110, while FIG. 2D shows section C-C in which the flexible legs 113 bend and grip the cable C when sleeve 120 is shrunk over the assembly.

Figure 3:
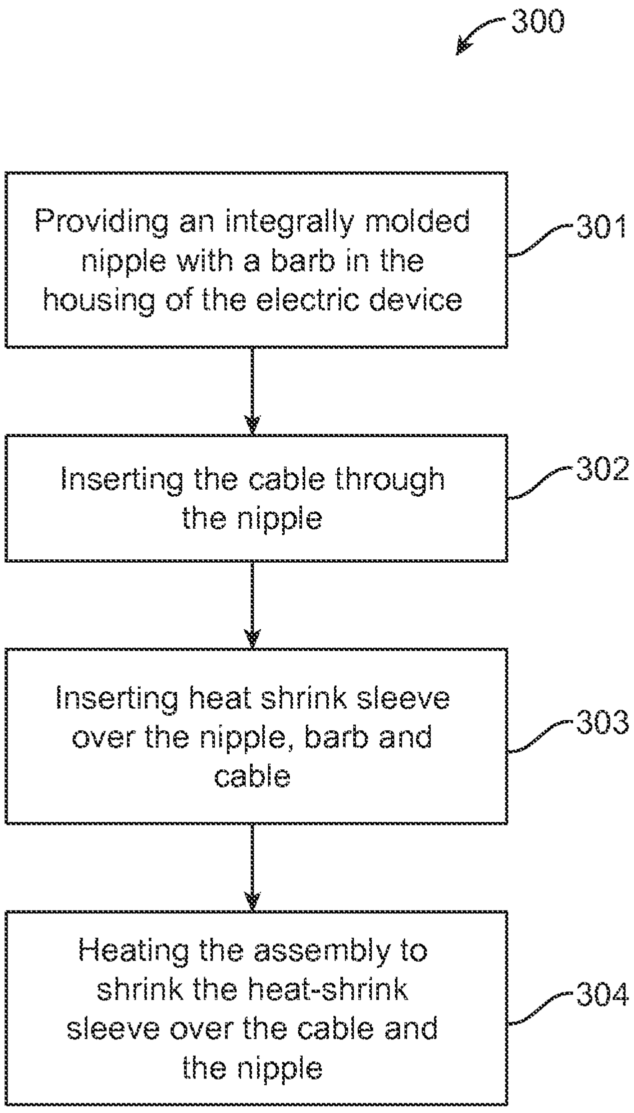
FIG. 3 shows one embodiment of a method of assembling a cable to a mot housing.

In one embodiment, a method of assembling a cable to a motor housing to provide a fluid tight strain relief seal is disclosed, as shown in FIG. 3 and with reference to FIGS. 1A-1C. In method 300, step 301 comprises providing an integrally molded nipple 110 with a barb 111 in the housing 101 of the electric device. In the next step 302, the cable C is inserted through the nipple 110. A sleeve 120 is then inserted to cover the nipple 110, barb 111 and cable C, in step 303. Finally, in step 304, a fluid-tight seal is provided by shrinking the sleeve 120 over the cable C and the nipple 110. In various embodiments, the sleeve 120 may comprise an adhesive-backed thermoplastic polymer heat-shrink sleeve that is configured to bond to the nipple 110 and the cable C to form a tough fluid-tight seal. In various embodiments illustrated above, the method of assembling a cable to a motor housing provides effective strain relief through reliable sealing and adherence of the sleeve 120 to the nipple 110 and the cable C, while maintaining flexibility, resistance to pull out and twisting of the cable C. Any pulling or twisting strain on the cable is passed on to the tough and flexible sleeve 120, and then onto the housing portion 101, thereby relieving strain on the conductors located within the cable C, without damage to the cable exterior.

The housing and method of assembly disclosed above provide for a waterproof connection for the power cord cable and allow the motor shell halves to be waterproof. This design also provides power cord cable strain relief while ensuring integrity of the cable and is capable of passing the UL 35 pound power cord cable pull test, in a more compact configuration. The advantages of the new design embodiments include a smaller sized motor as well as reduced space required in the cable attachment area. The one-step process of assembling a waterproof sleeve over the cable connection disclosed in the embodiments also provide ease of assembly with a dependable seal against moisture for both the power cord cable and motor, at reduced manufacturing cost.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope as further explained in the following examples, which however, are not to be construed to limit the scope of the invention as delineated by the claims.

What is claimed is:

1. A fluid-tight strain relief seal comprising:

a molded housing enclosing a motor-like device, the molded housing having an integrally molded nipple, wherein the nipple has a passage that is configured to advance an electrical cable therethrough;

the nipple comprising a proximal portion and a distal portion, wherein the proximal portion of the nipple is shaped like a barb and the distal portion is adjacent to an exterior wall of the housing; and a flexible sleeve, wherein the sleeve is fixed over the cable, the barb and the nipple to create a fluid-tight seal.

2. The seal of claim 1, wherein the sleeve is an adhesive-backed waterproof sleeve and is heat-shrunk over the cable, the barb and the nipple.

3. The seal of claim 1, wherein the nipple is slotted longitudinally about its proximal portion.

4. The seal of claim 1, wherein the inner surface of the nipple is provided with projections.

5. A method of assembling a strain relief seal, comprising;

inserting a cable through a nipple of a molded housing enclosing a motor-like device, the nipple integrally molded with the molded housing and having a portion shaped like a barb;

inserting a flexible sleeve over the cable, the barb and the nipple; and fixing the sleeve over the outer portion of the cable, the barb and the nipple to form a fluid-tight seal.

6. The method of claim 5, wherein the fixing the sleeve further comprises heat shrinking the sleeve.

7. The method of claim 5, wherein the fixing the sleeve further comprises using adhesive between the sleeve and one of the cable and the nipple.

8. A fluid-tight strain relief seal comprising:
- a molded housing enclosing a motor-like device, the molded housing having an integrally molded nipple, wherein the nipple has a passage that is configured to advance an electrical cable therethrough, wherein the cable requires strain relief at its connection point;
- the nipple comprising a proximal portion and a distal portion, wherein the proximal portion of the nipple is shaped like a barb and the distal portion is adjacent to an exterior wall of the housing; and
- a flexible adhesive-backed waterproof sleeve, wherein a fluid-tight seal is made and strain-relief is provided by heat-shrinking the sleeve over the cable, the barb and the nipple.

* * * * *